United States Patent
Lu et al.

(10) Patent No.: US 11,908,452 B1
(45) Date of Patent: Feb. 20, 2024

(54) ALTERNATIVE INPUT REPRESENTATIONS FOR SPEECH INPUTS

(71) Applicant: Amazon Technologies, Inc., Seattle, WA (US)

(72) Inventors: Sixing Lu, Bellevue, WA (US); Chengyuan Ma, Bellevue, WA (US); Chenlei Guo, Redmond, WA (US); Fangfu Li, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 17/325,523

(22) Filed: May 20, 2021

(51) Int. Cl.
*G10L 15/01* (2013.01)
*G06F 40/30* (2020.01)
*G10L 15/00* (2013.01)

(52) U.S. Cl.
CPC .............. *G10L 15/01* (2013.01); *G06F 40/30* (2020.01); *G10L 15/005* (2013.01)

(58) Field of Classification Search
CPC ........ G10L 15/01; G10L 15/005; G06F 40/30
See application file for complete search history.

(56) References Cited

U.S. PATENT DOCUMENTS

| | | | | |
|---|---|---|---|---|
| 7,403,939 B1* | 7/2008 | Virdy | ............... | G06F 16/24578 707/718 |
| 8,521,526 B1* | 8/2013 | Lloyd | ............... | G06F 16/3344 704/251 |
| 9,070,366 B1* | 6/2015 | Mathias | ............... | G10L 15/22 |
| 9,472,196 B1* | 10/2016 | Wang | ............... | G10L 15/22 |
| 2004/0233811 A1* | 11/2004 | Duffield | ............ | H04N 21/4623 348/E7.061 |
| 2012/0254216 A1* | 10/2012 | Aikawa | ............... | G06F 40/274 707/E17.014 |
| 2019/0171718 A1* | 6/2019 | Ishikawa | ............... | G06F 40/58 |
| 2019/0251122 A1* | 8/2019 | Rivas | ............... | G06F 16/24578 |
| 2020/0380991 A1* | 12/2020 | Ge | ............... | G10L 15/22 |
| 2021/0342517 A1* | 11/2021 | Ittycheriah | ............. | G06N 20/00 |
| 2022/0101287 A1* | 3/2022 | Hust | ............... | G06Q 20/123 |
| 2022/0366905 A1* | 11/2022 | Smarr | ............... | G10L 15/1815 |

* cited by examiner

*Primary Examiner* — Bhavesh M Mehta
*Assistant Examiner* — Darioush Agahi
(74) *Attorney, Agent, or Firm* — Pierce Atwood LLP

(57) ABSTRACT

Techniques for presenting an alternative input representation to a user for testing and collecting processing data are described. A system may determine that a received spoken input triggers an alternative input representation for presenting. The system may output data corresponding to the alternative input representation in response to the received spoken input, and the system may receive user feedback from the user. The system may store the user feedback and processing data corresponding to processing of the alternative input representation, which may be later used to update an alternative input component configured to determine alternative input representations for spoken inputs.

20 Claims, 10 Drawing Sheets

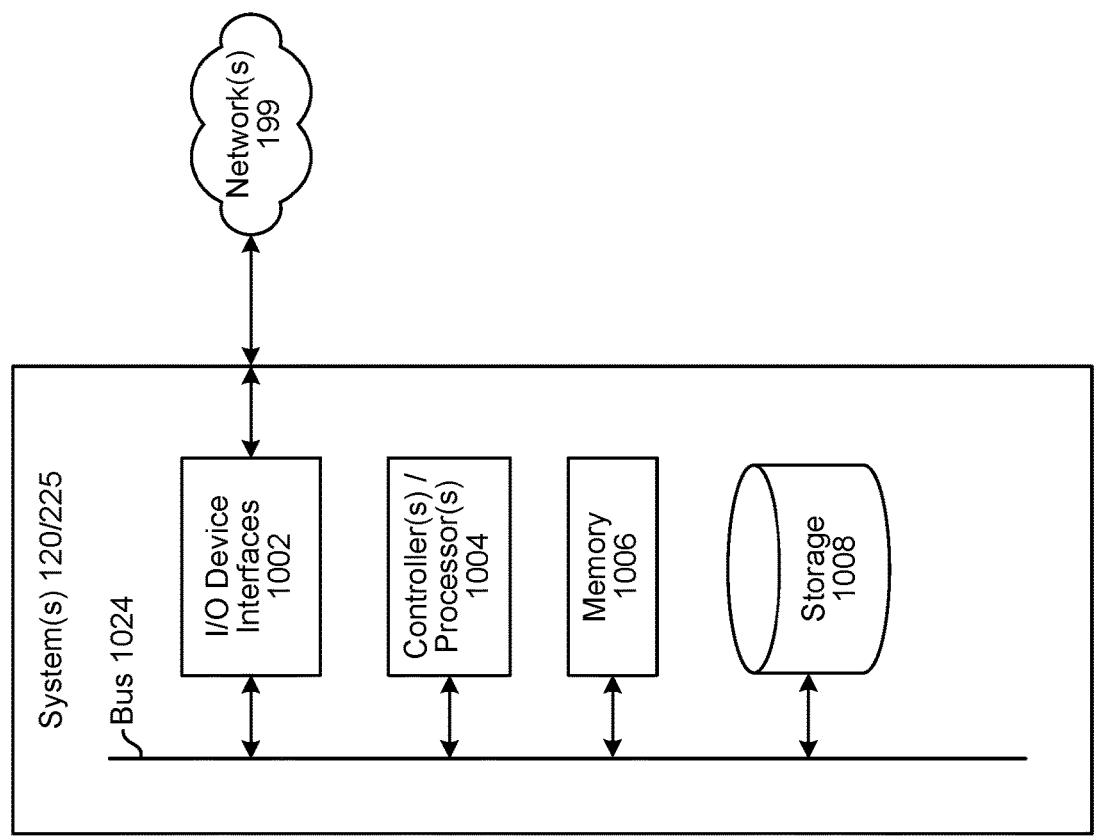

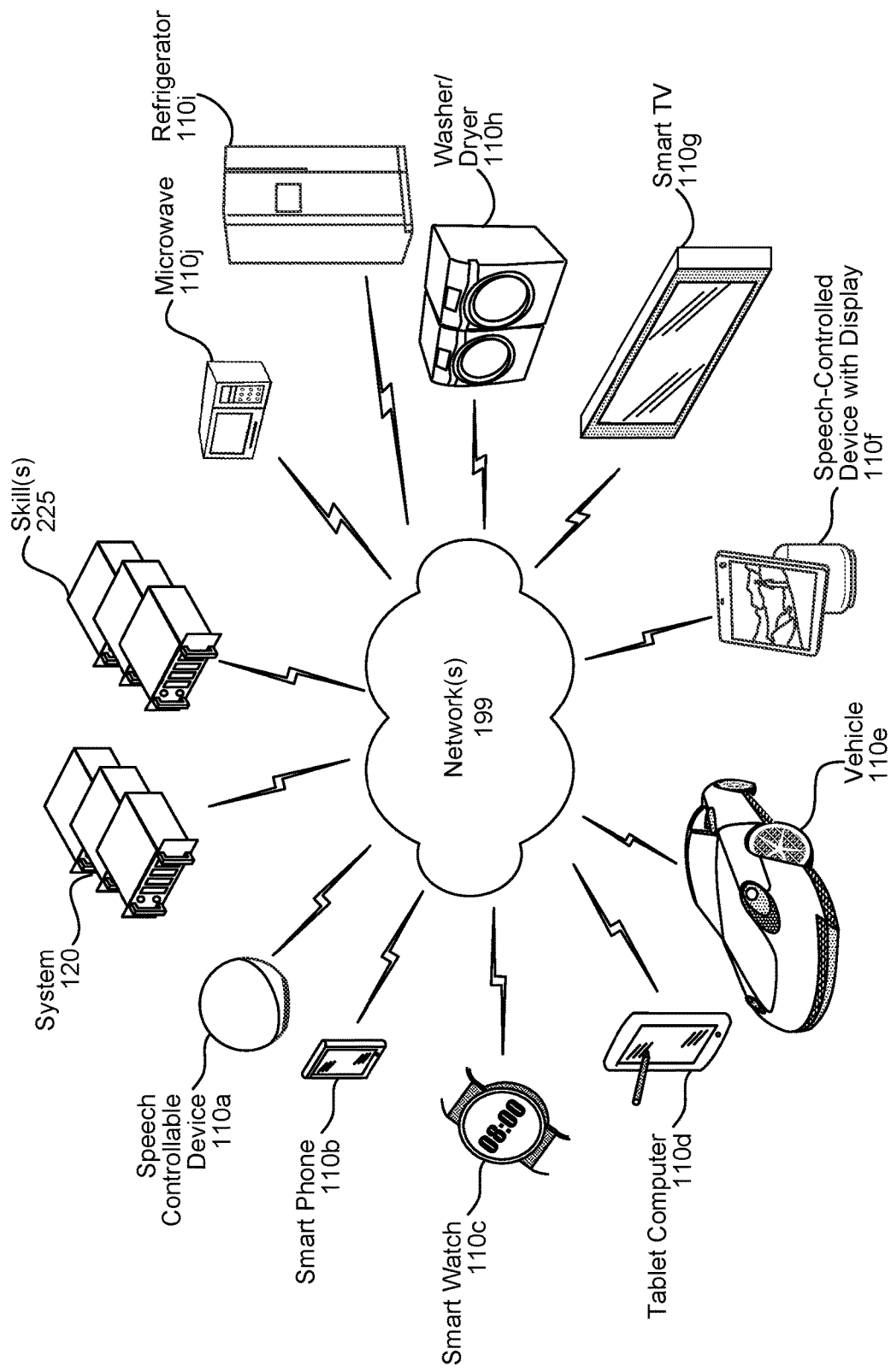

US 11,908,452 B1

ALTERNATIVE INPUT REPRESENTATIONS FOR SPEECH INPUTS

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 9 is a block diagram conceptually illustrating example components of a system, according to embodiments of the present disclosure.

FIG. 10 illustrates an example of a computer network for use with the overall system, according to embodiments of the present disclosure.

DETAILED DESCRIPTION

Figure 1:
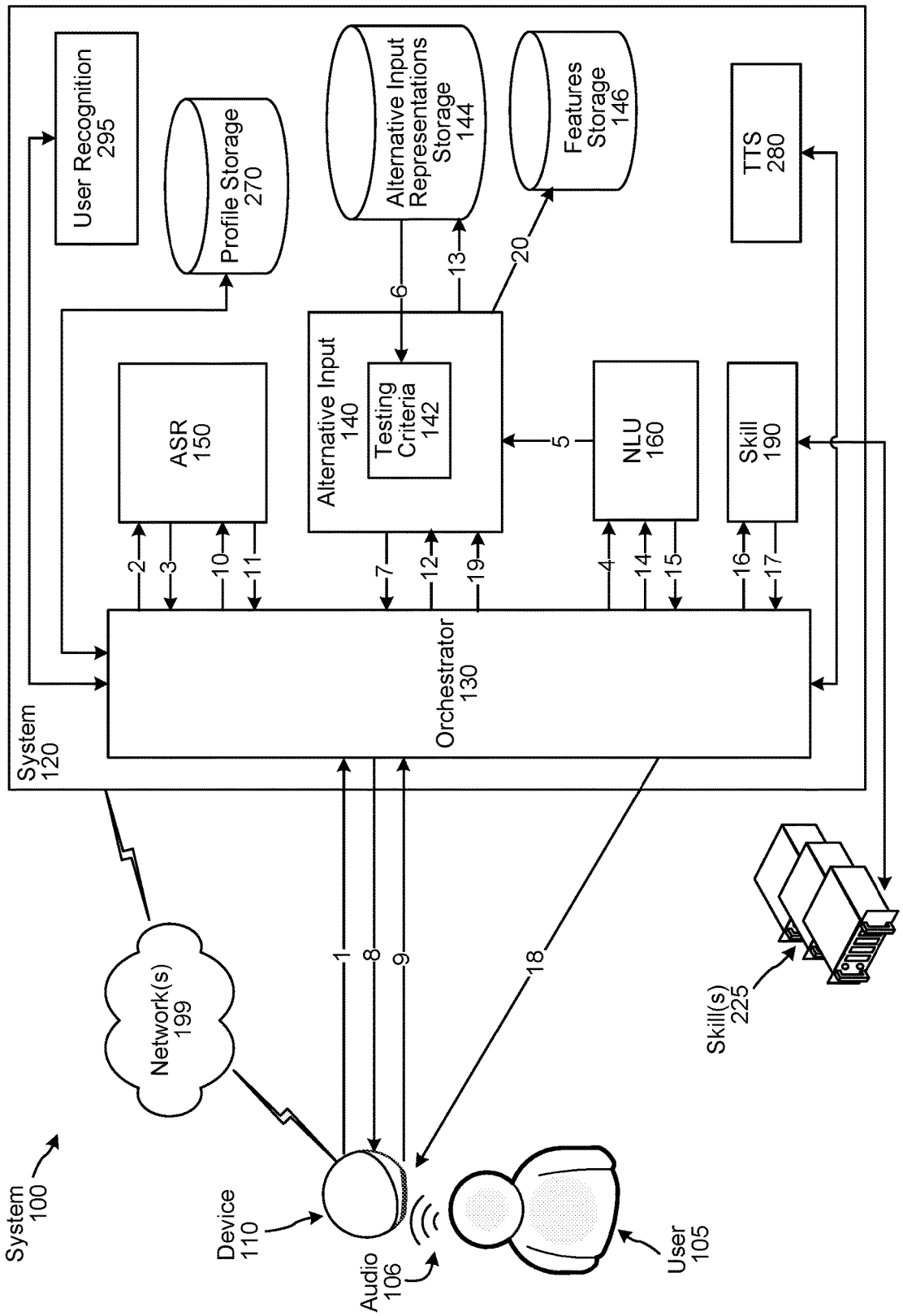
FIG. 1 is a conceptual diagram illustrating an example configuration of a system for testing alternative input representations, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play music by [artist]," a system may output music by the indicated artist. For further example, for the user input of "Alexa, what is the weather in [city]," a system may output synthesized speech representing weather information for the indicated city. In a further example, for the user input of "Alexa, send a message to [recipient]," a system may capture spoken message content and cause the same to be output via a device of the indicated recipient. In the foregoing examples, the actions correspond to outputting music, outputting synthesized speech, and causing spoken message content to be output.

A system may receive a user input as audio data representing speech. For example, a user may speak an input to a device. The device may send audio data, representing the spoken input, to the system. The system may perform ASR processing on the audio data to generate ASR data (e.g., ASR data, token data or text data) representing the words spoken by the user. The system may perform NLU processing on the ASR data to determine an intent of the user input as well as portions of the input that may be used to perform an action.

In some cases the system may perform an action that is not responsive to the user input or is not the user-desired action (e.g., the user's input was ambiguous, the system failed to properly understand the user, there was background noise that reduced the speech's signal to noise ratio, etc.). Such may occur due to an error in ASR processing, where the system may misrecognize one or more words spoken by the user. For example, the user may say "what is the weather like in <first city>" and the system may output the weather for a similarly sounding second city based on the ASR processing results indicating that the user said the second city rather than the first city.

To reduce such errors, the system may employ one or more techniques for input rewriting that involve an alternative input component(s) determining an alternative input representation of the user input, such that the alternative input representation results in the user-desired action being performed. Such techniques generally involve using historic interaction data, where the user rephrases an initial user input in an attempt to get the system to perform the desired action. The rephrased user input may be used to determine the alternative input representation of a user input, and the alternative input representation may be used for NLU and other processing by the system to perform a desired action. Such techniques may also rely on feedback from the user regarding whether the alternative input representation resulted in a desired action being performed.

The present disclosure provides a framework for testing alternative input representations by collecting user feedback and collecting speech processing signals. Some systems rely on user feedback and historic interaction data to determine alternative input representations. However, there may be alternative input representations, for example, provided by an application for which the system does not have any historic interaction data, such as prior user feedback. As a further example, there may be alternative input representations that do not have enough historic interaction data and/or enough of a particular kind of historic interaction data (e.g., not enough user feedback) for the system to use as a valid alternative input representation. Use of invalid alternative input representations can result in undesired system processing/outputs and user frustration. The techniques of the present disclosure facilitate collection of data for certain alternative input representations to configure/update alternative input systems.

In some embodiments, the system of the present disclosure maintains a queue of alternative input representations for testing. When an alternative input representation is triggered, for example based on a received user input, user profile information, device type information, domain, and/or skill information, the system presents the alternative input representation to the user (e.g., "did you mean [the alternative input representation]" or "ok, I performed [the alternative input representation]"). The system may receive feedback from the user in response to the alternative input representation. The system may store NLU data based on performing NLU processing using the alternative input representation and may store system response data representing the action performed by the system based on further processing with respect to the alternative input representation. As used herein, testing an alternative input representation may involve presenting the alternative input representation to a user, storing user feedback with respect to the alternative input representation, and storing processing data corresponding to the alternative input representation, such as, NLU data and system response data. The purpose of using the alternative input representation for testing is to collect feedback data (positive or negative) and processing data for the alternative input representation by running the alternative input representation through a speech processing pipeline. The collected data can then be used to update a component or system that is configured to generate alternative input representations for user inputs.

The framework of the present disclosure enables control over how an alternative input representation is tested, so that the user experience is not materially degraded (e.g., user does not notice it or in the aggregate users are not bothered by it). For example, there may be a limit on the number of times a particular alternative input representation is tested. In another example, there may be a limit on the number of times the system can test any alternative input representations in a given period of time. As another example, there may also be a limit on the number of times an alternative input representation is presented for testing to the same user. As another example, there may also be a testing period (e.g., 72 hours), after which the alternative input representation may not be tested.

The framework of the present disclosure also enables control over which users an alternative input representation is tested with, so that a developer can collect appropriate data. For example, an alternative input representation may be presented when the user input is provided by a user associated with certain profile features (e.g., location, age, other demographic information, etc.). In another example, an alternative input representation may be presented when the user input relates to a particular domain or skill. In another example, an alternative input representation may be presented when the user input is received from a particular device type.

As used herein, a "domain" may refer to a collection of related functionality. Multiple skills, for related functionalities, may be associated with a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. A skill may be configured to perform a functionality. What is referred to herein as a skill may sometimes be referred to as an application, bot, action, or the like. One or more skills that perform related functionalities may be associated with a domain. For example, a first music skill and a second music skill may be associated with the music domain.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 shows a system 100 configured to test alternative input representations, in accordance with example embodiments. As shown in FIG. 1, the system 100 may include a device 110, local to a user 105, and a system 120 connected across one or more networks 199. The network 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be a speech processing system configured to process spoken natural language inputs using ASR and NLU processing. The system 120 may include multiple components to facilitate speech processing, such as, an orchestrator component 130, an ASR component 150, an alternative input component 140, a NLU component 160 and a skill component 190. The system 120 may further include an alternative representations storage 144 and a feature storage 146. In some embodiments, the alternative representations storage 144 and the feature storage 146 may be outside of the system 120 and may be in wired or wireless communication, over the network(s) 199, with the system 120. The orchestrator component 130 may be configured to route data to the appropriate components of the system 120 to facilitate processing of a spoken natural language input.

The user 105 may speak an input, and the device 110 may capture audio representing the spoken input. The device 110 may send (step 1) audio data to the system 120 for processing. The orchestrator component 130 may send (step 2) the audio data to the ASR component 150, and the ASR component 150 may process the audio data to determine ASR data (e.g., token data, text data, ASR hypotheses including token or text data and corresponding confidence scores, etc.) representing the words spoken by the user 105. The ASR component may send the ASR data (step 3) to the orchestrator component 130.

The orchestrator component 130 may send (step 4) the ASR data to the NLU component 160 for processing. The NLU component 160 may perform NLU processing using the ASR data to determine NLU data including at least an intent and entity data corresponding to the spoken input. The NLU component 160 may invoke (step 5) the alternative input component 140. In some embodiments, the NLU component 160 may invoke the alternative input component 140 via the orchestrator component 130. The NLU component 160 may send the ASR data to the alternative input component 140. The NLU component 160 may also send the NLU data in some embodiments to the alternative input component 140.

The alternative input component 140, in some embodiments, may be configured to determine an alternative input representation for testing. As used herein, testing an alternative input representation refers to presenting the alternative input representation to the user 105, or presenting an output generated using the alternative input representation, receiving feedback with respect to the presented alternative input representation or output, and storing data corresponding to the alternative input representation that may be used to configure or update the alternative input component 140.

In some embodiments, the alternative input component 140 may include a testing criteria component 142. The testing criteria component 142 may be configured to determine whether a user input and corresponding data satisfy one or more criteria for testing an alternative input representation from the alternative input representations storage 144. The alternative input representations storage 144 may store multiple alternative input representations for testing, and may also store testing criteria corresponding to the alternative input representations. In some embodiments, the testing criteria may specify an alternative input representation may be presented to the user 105 when a particular spoken user input is received by the system 120. For example, the alternative input representation may be "add ranch dressing to the shopping list" and the spoken user input specified in the testing criteria may be "add rice dressing to the shopping list." The spoken user input may be represented as token data or text data in the alternative input representations storage 144. The testing criteria component 142 may retrieve (step 6) an alternative input representation from the storage 144, and compare the ASR data, corresponding to the input spoken by the user 105, to the spoken user input stored in the alternative input representations storage 144 as the testing criteria for the alternative input representation. If the ASR data matches (or is substantially similar to) the stored spoken user input, then the testing criteria component 142 may retrieve the alternative input representation from the alternative input representations storage 144. In some embodiments, the alternative input component 140 may update a counter for the alternative input representation, where the counter may track the number of times the alternative input representation is tested/presented to a user of the system 120. The counter may be stored in the alternative input representations storage 144.

The alternative input component 140 may send (step 7), to the orchestrator component 130, output data corresponding to the alternative input representation retrieved from the alternative input representations storage 144. The output data may include data representing the alternative input representation. For example, the output data may be "did you mean add ranch dressing to the shopping list" or "do you want me to add ranch dressing to the shopping list." The orchestrator component 130 may send (step 8) the output data to the device 110. The output data may include audio data representing synthesized speech. The output data may also or alternatively include text data that may be displayed at the device 110. The output data may also or alternatively include image data, video data, or other data for output to the user 105.

The device 110 may output the output data, corresponding to the alternative input representation, received from the system 120. For example, the device 110 may output audio of synthesized speech, display text, and/or display an image, video, etc. The user 105 may provide an input representing feedback responsive to the output data. The input, from the user 105, may be a spoken input, a physical input such as touching a screen of the device 110 or a button of the device 110, a gesture such as a head nod, or other type of input. The device 110 may capture the input from the user 105, and may send (step 9) the input data to the orchestrator component 130. If the input data is audio data representing a spoken input, then the orchestrator component 130 may send (step 10) the input data to the ASR component 150 for processing. The ASR component 150 may determine ASR data corresponding to the input data, and may send (step 11) the ASR data to the orchestrator component 130.

The orchestrator component 130 may send (step 12) the ASR data, corresponding to the input data, to the alternative input component 140. The alternative input component 140 may store (step 13) the input data representing the feedback, for the alternative input representation, in the alternative input representations storage 144. If the feedback is positive (e.g., the user said "yes"), then the orchestrator component 130 may send (step 14) the alternative input representation to the NLU component 160 for processing. The alternative input representation may be embodied as text data, token data, or any other form of data that may be output by the ASR component 150 and input to the NLU component 160.

The NLU component 160 may determine NLU data corresponding to the alternative input representation. The NLU data may include intent data and slot data corresponding to the alternative input representation. The NLU component 160 may send (step 15) the NLU data to the orchestrator component 130. The orchestrator component 130 may select the skill component 190 to determine an action responsive to the alternative input representation, and may send (step 16) the NLU data to the skill component 190. The skill component 190 may determine output data based on the NLU data and which is responsive to the alternative input representation. The output data may be text data, token data or other structured data that may be used to generate synthesized speech or text for display. The orchestrator component 130 may send (step 18) the output data to the device 110.

The orchestrator component 130 may send (step 19) the NLU data corresponding to the alternative input representation and the output data, corresponding to the alternative input representation, to the alternative input component 140. The alternative input component 140 may store (step 20) the alternative input representation, the NLU data and the output data in the features storage 146. In some embodiments, the data stored in the features storage 146 may be used by the alternative input component 140 to configure or update one or more components of the alternative input component 140.

The system 120 may operate using other components illustrated in FIG. 1. The various components may be located on a same or different physical devices. Communication between various components may occur directly or across a network(s) 199.

A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 220 (shown in FIG. 2). The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 220 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data, representing the audio 106, to the system 120. The audio data may include the detected wakeword, or the device 110 may remove the portion of the audio data, corresponding to the detected wakeword, prior to sending the audio data to the system 120.

The system 120 may include an orchestrator component 130 configured to, among other things, coordinate data transmissions between components of the system 120. The orchestrator component 130 may receive the audio data from the device 110, and send the audio data to an ASR component 150.

The ASR component 150 transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data 211 based on a similarity between the audio data 211 and pre-established language models. For example, the ASR component 150 may compare the audio data with models for sounds (e.g., subword units, such as phonemes, etc.) and sequences of sounds to identify words that match the sequence of sounds of the speech represented in the audio data.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to a NLU component 160.

The NLU component 160 processes the ASR output data or text data to determine one or more NLU hypotheses embodied in NLU output data. The NLU component 160 may perform intent classification (IC) processing on the ASR output data or text data to determine an intent of the natural language input. An intent corresponds to an action to be performed that is responsive to the natural language input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in ASR output data or text data to the words and phrases in an intents database. In some embodiments, the NLU component 160 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 160 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 160 may be linked to one or more grammar frameworks with entity types to be populated with entity values. Each entity type of a grammar framework corresponds to a portion of ASR output data or text data that the NLU component 160 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data or text data as subject, object, verb, preposition, etc. based on grammar rules and/or models. Then, the NLU component 160 may perform IC processing using the identified verb to identify an intent. Thereafter, the NLU component 160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 160 may generate NLU output data including one or more NLU hypotheses, with each NLU hypothesis including an intent and optionally one or more entity types and corresponding entity values. In some embodiments, the NLU component 160 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component 160). In at least some embodiments, the system 120 may implement a spoken language understanding (SLU) component configured to process audio data to determine NLU output data.

The SLU component may be equivalent to a combination of the ASR component 150 and the NLU component 160. Yet, the SLU component may process audio data and directly determine the NLU output data, without an intermediate step of generating ASR output data. As such, the SLU component may take audio data representing a spoken natural language input and attempt to make a semantic interpretation of the spoken natural language input. That is, the SLU component may determine a meaning associated with the spoken natural language input and then implement that meaning. For example, the SLU component may interpret audio data representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 190 and/or may communicate with one or more skill systems 225. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill 190 may operate in conjunction between the system 120 and other devices, such as the device 110, a restaurant electronic ordering system, a taxi electronic booking system, etc. in order to complete certain functions. Inputs to a skill 190 may come from speech processing interactions or through other interactions or input sources.

A skill 190 may be associated with a domain, a non-limiting list of which includes a smart home domain, a music domain, a video domain, a weather domain, a communications domain, a flash briefing domain, a shopping domain, and a custom domain.

The system 120 may include a TTS component 280 that generates audio data including synthesized speech. The data input to the TTS component 280 may come from a skill system 225, the orchestrator component 130, or another component of the system 120.

In one method of synthesis called unit selection, the TTS component 280 matches input data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data corresponding to the audio 106. The user recognition component 295 may perform user recognition by comparing speech characteristics, in the audio data, to stored speech characteristics of users. The user recognition component 295 may additionally or alternatively perform user recognition by comparing biometric data (e.g., fingerprint data, iris data, retina data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that received the natural language input.

The user recognition component 295 determines whether a natural language input originated from a particular user. For example, the user recognition component 295 may determine a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill 225, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 270 may include one or more user profiles. Each user profile may be associated with a different user identifier. Each user profile may include various user identifying data (e.g., name, age, address, language(s), etc.). Each user profile may also include preferences of the user. Each user profile may include one or more device identifiers, each representing a respective device registered to the user. Each user profile may include skill identifiers of skills 225 that the user has enabled. When a user enables a skill 225, the user is providing the system 120 with permission to allow the skill 225 to execute with respect to the user's natural language inputs. If a user does not enable a skill 225, the system 120 may not execute the skill 225 with respect to the user's natural language inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 2:
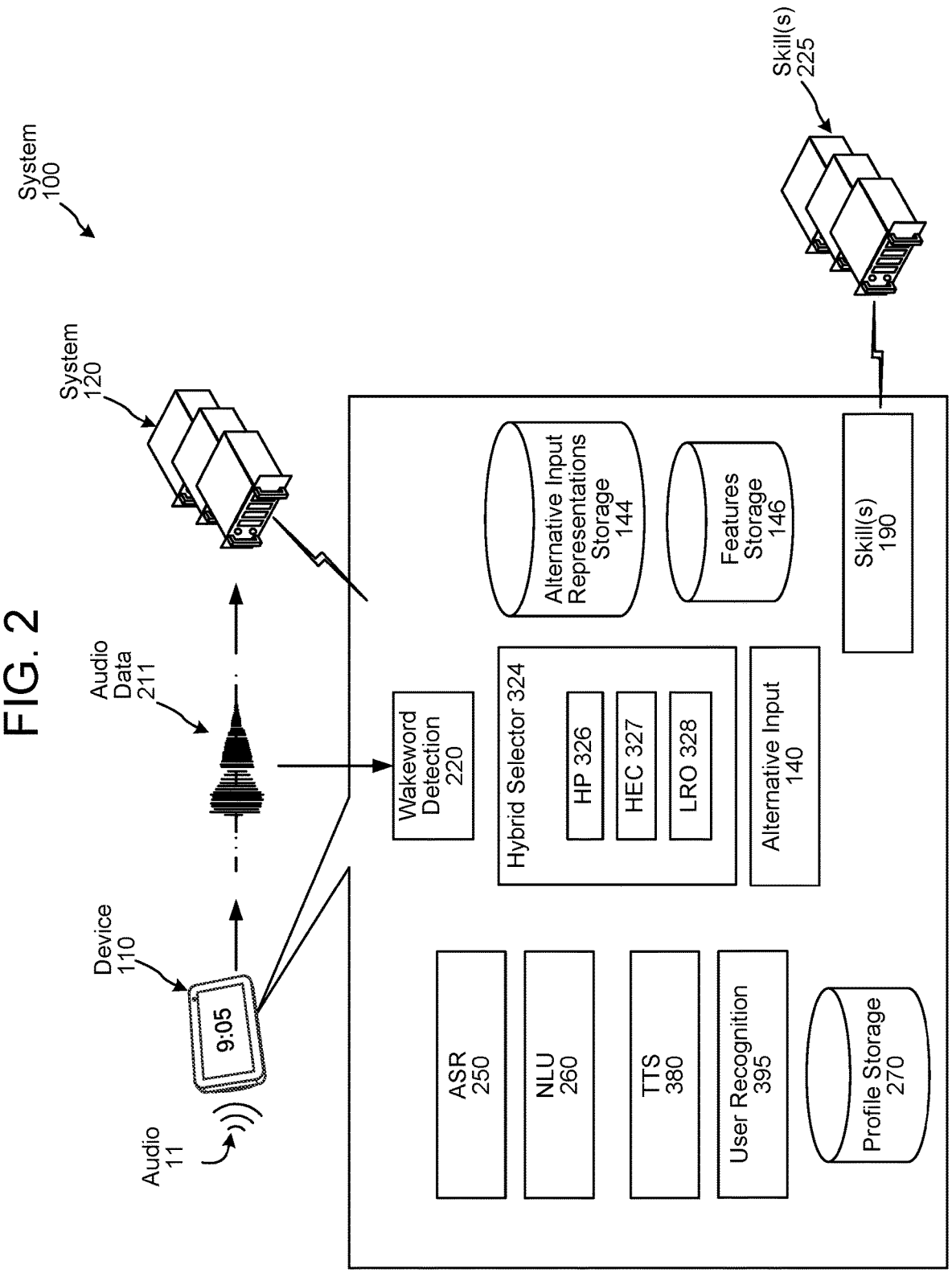
FIG. 2 is a conceptual diagram illustrating components that may be included in a device, according to embodiments of the present disclosure.

The foregoing describes illustrative components and processing of the system 120. The following describes illustrative components and processing of the device 110. As illustrated in FIG. 2, in at least some embodiments the system 120 may receive audio data 211 from the device 110, to recognize speech corresponding to a spoken natural language in the received audio data 211, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 220 configured to detect a wakeword (e.g., "Alexa") that indicates to the device 110 that the audio data 211 is to be processed for determining NLU output data. In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or an on-device ASR component 150. The wakeword detection component 220 may also send an indication, to the hybrid selector 324, representing a wakeword was not detected. In response to receiving such an indication, the hybrid selector 324 may refrain from sending the audio data 211 to the system 120, and may prevent the on-device ASR component 150 from processing the audio data 211. In this situation, the audio data 211 can be discarded.

The device 110 may conduct its own speech processing using on-device language processing components (such as an on-device SLU component, an on-device ASR component 150, and/or an on-device NLU component 160) similar to the manner discussed above with respect to the speech processing system-implemented ASR component 150, and NLU component 160. The device 110 may also internally include, or otherwise have access to, other components such as one or more skills 225, a user recognition component 295 (configured to process in a similar manner to the speech processing system-implemented user recognition component 295), profile storage 270 (configured to store similar profile data to the speech processing system-implemented profile storage 270), and other components. In at least some embodiments, the on-device profile storage 270 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the on-device ASR component 150 about the availability of the audio data 211, and to otherwise initiate the operations of on-device language processing when the audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 150 by routing the audio data 211 through the HEC 327 of the hybrid selector 324, whereby the LRO 328 notifies the on-device ASR component 150 of the audio data 211. At this point, the hybrid selector 324 may wait for response data from either or both the system 120 and/or the on-device language processing components. However, the disclosure is not limited thereto, and in some examples the hybrid selector 324 may send the audio data 211 only to the on-device ASR component 150 without departing from the disclosure. For example, the device 110 may process the audio data 211 on-device without sending the audio data 211 to the system 120.

The on-device ASR component 150 is configured to receive the audio data 211 from the hybrid selector 324, and to recognize speech in the audio data 211, and the on-device NLU component 160 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 160) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 211 to the system 120, and the response data from the system 120 may include the unique identifier to identify to which natural language input the response data corresponds.

The device 110 may also include the alternate input component 140 described herein. In other embodiments, the device 110 may include the alternative input representations storage 144 and/or the features storage 146. In other embodiments, the device 110 may be in communication with the alternative input representations storage 144 and/or the features storage 146, when one or both of them may be located separately from the device 110.

In at least some embodiments, the device 110 may include one or more skills 225 that may process similarly to the speech processing system-implemented skill(s) 225. The skill(s) 225 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 3:
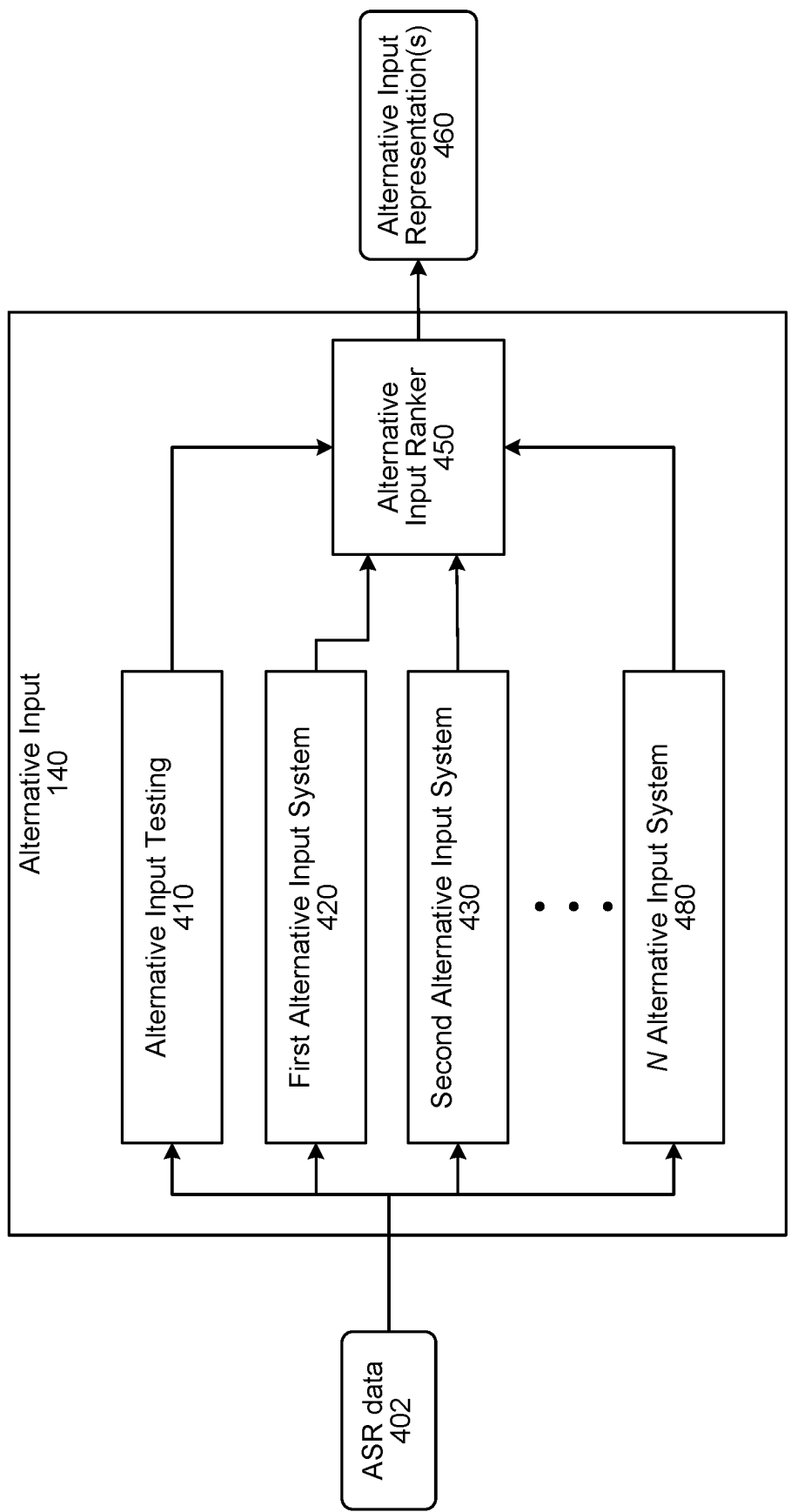
FIG. 3 is a conceptual diagram illustrating example components of an alternative input component, according to embodiments of the present disclosure.

FIG. 3 is a conceptual diagram illustrating example components of the alternative input component 140, according to embodiments of the present disclosure. The alternative input component 140 may be configured to determine an alternative input representation for a user input provided by a user. A user input may be provided in various forms, for example, a statement, a query, a question, a command, etc. For example, in some cases, certain spoken inputs may be misrecognized by the ASR component 150, and using stored data, the alternative input component 140 may determine an alternative input representation (e.g., a rephrased input, a rewrite of the input, etc.), for the spoken input, that results in a desired action being performed. The alternative input component 140 may process ASR data 402 corresponding to the user input received by the system 120. The ASR data 402 may be an output of the ASR component 150 based on processing audio data corresponding to the user input.

In some embodiments, the alternative input component 140 may implement multiple different techniques to determine the alternative input representation. For example, the alternative input component may implement a first alternative input system 420 that may determine an alternative input representation(s) based on the ASR data 402 using a first technique, a second alternative input system 420 that may determine an alternative input representation(s) based on the ASR data 402 using a second technique, and so on (e.g., N alternative input system 480).

One of the techniques for determining an alternative input representation(s) may involve using a probabilistic graph (e.g., a Markov Chain). Users may experience errors with an initial user input and may need to repeat or rephrase their queries to facilitate system understanding. Such rephrase pairs—e.g., a failed attempt with one phrasing and a subsequent success with a later phrasing having the same intent—may be leveraged by the alternative input component 140 in this technique to improve system performance in handling future user inputs. For example, the alternative input component 140 may use user input rephrasings to generate a probabilistic graph that can be used to select an alternative input representation(s) for the instant user input. The alternative input component 140 may also use the probabilistic graph to determine if a user input is likely to lead to an error or otherwise may result in an outcome that results in an undesired user experience. If so, the alternative input component 140 may select an alternative input representation of the user input that may be passed to downstream processing components (e.g., NLU components) which may ultimately be more likely than the original user input to produce the output intended by the user. In some embodiments of this technique, the probabilistic graph, for example, a Markov Chain, includes multiple nodes, where each node may represent a unique NLU interpretation including a respective domain, a respective intent and respective entity (slot) data. The alternative input component 140 may determine probability data by traversing the graph, using an ASR hypothesis for the user input to determine the starting (initial) node, and traversing till an end node is reached. The end node may represent the alternative input representation for the user input if the end node is indicated as a success condition. A node may be connected to one or more nodes using edges. The probability data may be based on the weights of the edges of the traversal path. The probability data may be based on a value of an intermediate node or an end node of the traversal path. In other embodiments, the probability data may be based on aggregating the weights of edges in the traversal path from an initial node to an end node. In some cases, the traversal path may end at the initial node, indicating that the ASR hypothesis results in successful processing. In some cases, the end node may be indicated as an error condition, in which case the alternative input component 140 is unable to provide alternative input representation that will result in successful processing. In some cases, the alternative input component 140 may output NLU data corresponding to the determined alternative input representation. The alternative input component 140 may traverse multiple paths starting with the initial node representing the ASR hypothesis for the user input and ending at multiple end nodes. For example, the alternative input component 140 may traverse a first path starting at the initial node and ending at a first end node having first probability data and/or corresponding to a first alternative input representation. The alternative input component 140 may traverse a second path starting at the initial node and ending at a second end node having second probability data and/or corresponding to a second alternative input representation. In some embodiments, the alternative input representation may correspond to a first domain (or a first intent) that is different than a second domain (or second intent) corresponding to the ASR hypothesis for the user input.

Another technique for determining an alternative input representation(s) may involve using user-specific interaction data (e.g., past user inputs provided by the user, past rephrased user inputs provided by the user, past system responses to the rephrased user inputs, etc.) to determine a user-specific (personalized) alternative input representation for the user input. For example, a user may say "turn on the lights" every time he or she enters the home. But in one instance, the speech processing system may understand the input as "turn onto flights" (due to background noise or other factors). This may cause the system to fail to identify or otherwise "understand" what the user is referring to. Using techniques described herein, the alternative input component 140 may process this type of user input in view of the past inputs from the user to determine that the user meant "turn on the lights," and respond by performing the appropriate action. The alternative input component 140 may determine historical user data corresponding to past user inputs received from the user 105. The historical user data may be determined using user profile data associated with the user 105. The alternative input component 140 may retrieve data related to user inputs provided by the user 105 in the past (e.g., historical user inputs). The data may include ASR data representing the past user input, and may also include an indication of whether the past user input was successfully processed by the system 120 (e.g., resulted in the response intended by the user). If the past user input was successfully processed, then the alternative input component 140 may use the corresponding ASR data as the historical user data. In some embodiments, the alternative input component 140 may also determine frequency data corresponding to the past user input, where the frequency data may indicate how often the user 105 provided the past user input during a given time period (e.g., over the past month, over the past week). The alternative input component 140 may include the frequency data in the historical user data for further processing. The historical user data may relate to multiple user inputs provided by the user 105 in the past. The alternative input component 140 may process, using a trained component (e.g., a machine learning model), the ASR hypotheses for the user input and the historical user data to determine alternative input representation(s) corresponding to the user input. The alternative input component 140 may also process other data relating to or generating during ASR processing, such as phoneme data, ASR confidence scores, ASR N-best list ranking, etc. to determine the alternative input representation(s). The trained component may be configured to determine if one or more of the ASR hypotheses are substantially similar to a past user input provided by the user 105. In some cases, the ASR hypotheses corresponding to the user input may cause an error during further processing (e.g., NLU processing error, generation of a response that was not intended by the user, etc.). To avoid such errors, the alternative input component 140 may determine if the user input is similar to one of the past user inputs. For such a determination the alternative input component 140 may consider how frequently the past user input was provided by the user 105. Using the trained component, the alternative input component 140 may determine a likelihood of the user input being similar to a past user input, and if the likelihood meets a threshold, then the alternative input component 140 may determine to rewrite the user input using the ASR data corresponding to the past user input (rather than using the 1-best ASR hypothesis). The trained component may output a score indicating whether the user input should be rewritten or not. For example, if the alternative input component 140 determines that the user input can be successfully processed (without ASR, NLU or other types of errors), and the historical user data does not indicate a past user input that is similar to the instant user input, then the alternative input component 140 may determine to not rewrite the user input. In other words, the user input may be one that the user does not provide often or is providing for the first time. The trained component may also be configured to process ASR scores associated with the ASR hypotheses, phonetics or other data related to the ASR hypothesis or determined during ASR processing. In some embodiments of this technique, the alternative input component 140 may determine encoded data for the ASR hypotheses for the user input and encoded data for a past user input for the user 105, and process these encoded data using the trained component and an attention mechanism. In an example embodiment, the trained component may be a neural network model, such as a DNN. The output of the trained component may be a score indicating a likelihood of whether the user input is substantially similar to or matches the past user input. The alternative input component 140 may perform these operations with another past user input from the user 105 to determine if the user input is substantially similar to another past user input.

Another technique for determining an alternative input representation(s) may involve using an encoder-decoder architecture that may rewrite the user input (e.g., query rewriting). The alternative input component 140 may include a trained component that may include an encoder-decoder framework, such as a seq2seq model, including an encoder, a decoder, and an attention mechanism. The seq2seq model may be a pointer-generator model that points to historical data including ASR data for past inputs from multiple users that resulted in successful processing and the ASR N-best list for the instant user input, and retrieves words one by one from the historical data and the ASR N-best list to generate an alternative input representation for the instant user input. The trained component may process an ASR hypothesis for the user input using the encoder, a past input using the encoder, and process the encoded ASR hypothesis and the encoded past input using the attention mechanism and the decoder to generate the alternative input representation.

Another technique for determining alternative input representation(s) may involve querying a database storing pairs of user inputs and alternative input representations, and retrieving pairs that are semantically similar to the user input corresponding to the ASR data 402. In this technique, the alternative input component 140 may use various data search techniques to generate an alternative input representation(s) for the user input. The alternative input component 140 may use one or more indexes that may be constructed using previous instances of when user inputs were rewritten. The data search techniques may be run against the index(es) to identify one or more candidate alternative input representations. When more than one alternative input representation is generated, they may be ranked using context information. The alternative input component 140 may determine a similarity score for an alternative input representation included in the index(es). The alternative input component 140 may encode the ASR hypothesis for the user input, and may encode an alternate alternative input representation from the index(es). The alternative input component 140 may determine a cosine distance between the encoded ASR hypothesis and the encoded alternative input representation, and may determine the similarity score based on the cosine distance. In some embodiments, the alternative input component 140 may determine a semantic similarity between the ASR hypothesis for the user input and the alternative input representation from the index(es). The alternative input component 140 may include an alternative input ranker 450, which may be configured to generate a merged ranked list of alternative input representations using (e.g., combining) the alternative input representations determined by different alternative input systems 410, 420, 430 and 480. The alternative input ranker 450 may output a N-best list of alternative input representations 460 or may output a single alternative input representation 460. The alternative input ranker 450 may determine the merged ranked list of alternative input representations based on the respective scores (e.g., confidence scores, probability scores, weight values, etc.) of the alternative input representations, where the scores may be determined by the respective alternative input systems 410, 420, 430 and 480. To determine the merged ranked list, the alternative input ranker 450, in some embodiments, may also use other context data corresponding to the user input, such as user profile data (from the profile storage 270) for the user that provided the input, device information for the device 110 that captured the user input, historic interaction data for the user's interactions with the system 120, user preferences for testing alternative input representations, user feedback to past alternative input representations presented for testing, etc.

The alternative input representation(s) 460 may be provided to the NLU component 160 for processing. In some cases, the NLU component 160 may select the alternative input representation 460 to continue processing to generate an output responsive to the user input. In other cases, the NLU component 160 may select the NLU hypothesis determined by the NLU component 160 to continue processing to generate an output responsive to the user input.

The alternative input testing component 410 may determine an alternative input representation for testing, as described above in relation to FIG. 1. This alternative input representation may be included in the list of alternative input representations 460 or may be the single alternative input representation 460. In some embodiments, if there are no alternative input representations determined by the other alternative input systems 420, 430 and 480, then the alternative input ranker 450 may select the alternative input representation, determined by the alternative input testing component 410, as the alternative input representation 460. In some embodiments, if the scores of the alternative input representations determined by the other alternative input systems 420, 430 and 480 do not satisfy a condition (e.g., exceed a threshold value), then the alternative input ranker 450 may select the alternative input representation, determined by the alternative input testing component 410, as the alternative input representation 460. In yet other embodiments, the alternative input ranker 450 may select the alternative input representation determined by the alternative input testing component 410 instead of other alternative input representations determined by the other systems 420, 430 and 480, thus prioritizing the alternative input testing component 410 over the other alternative input systems.

The data collected by the alternative input testing component 410 (stored in the features storage 146) during testing of an alternative input representation may be used by one or more of the alternative input systems 420, 430 and 480 to configure or update their respective techniques for determining an alternative input representation.

Figure 4:
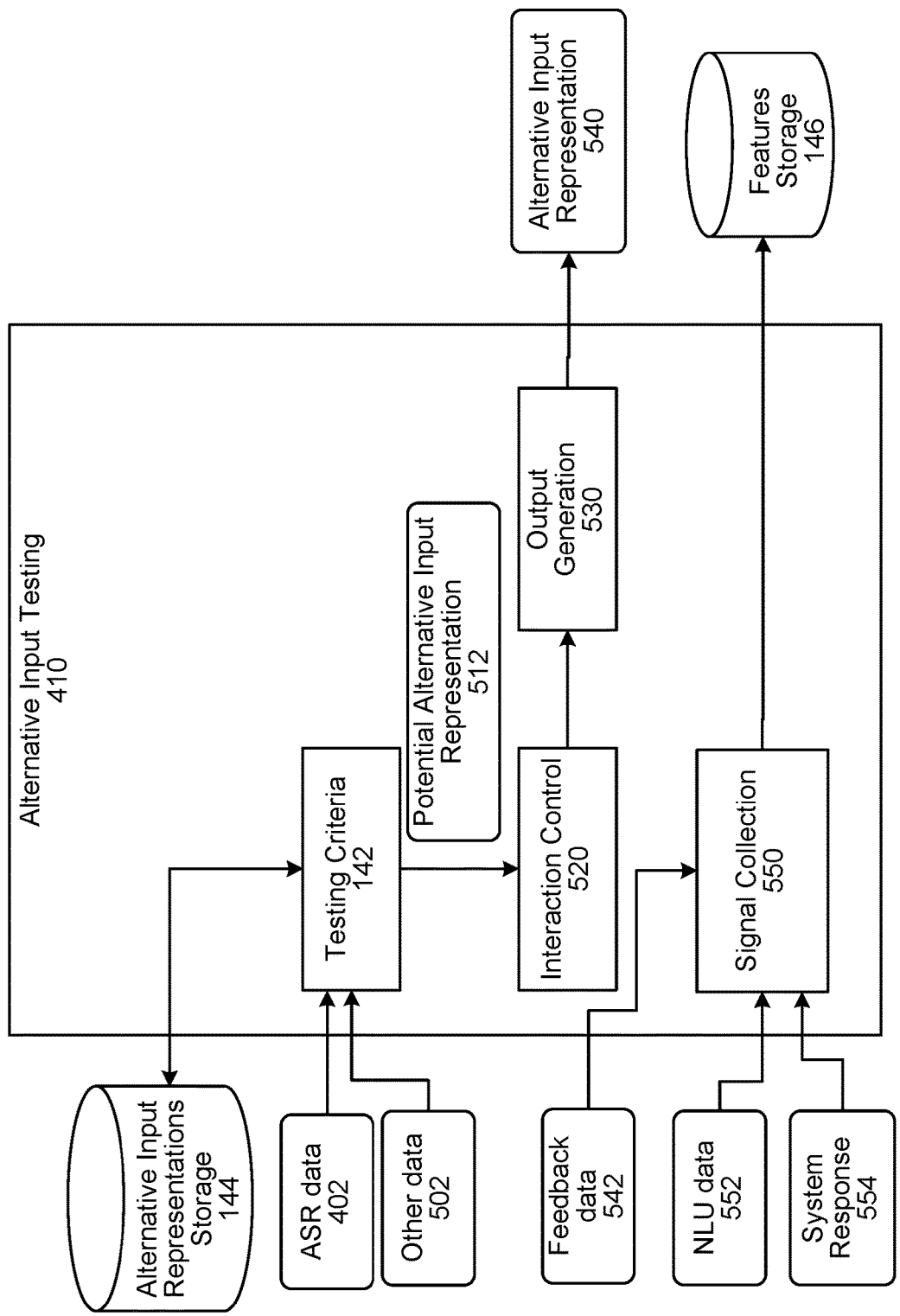
FIG. 4 is a conceptual diagram illustrating example components of an alternative input testing component, according to embodiments of the present disclosure.

FIG. 4 is a conceptual diagram illustrating example components of the alternative input testing component 410, according to embodiments of the present disclosure. The alternative input testing component 410 may include the testing criteria component 142, an interaction control component 520, an output generation component 530 and a signal collection component 550.

The testing criteria component 142 may determine, based on testing criteria for an alternative input representation, whether the alternative input representation is triggered for testing for the particular user input corresponding to the ASR data 402. The interaction control component 520 may determine whether the alternative input representation should be presented to the user 105 during this particular interaction. The output generation component 530 may determine how the alternative input representation may be presented to the user 105. The signal collection component 550 may receive data corresponding to the testing of the alternative input representation, and may store the data for later use by the alternative input systems 420, 430 and 480.

Figure 5:
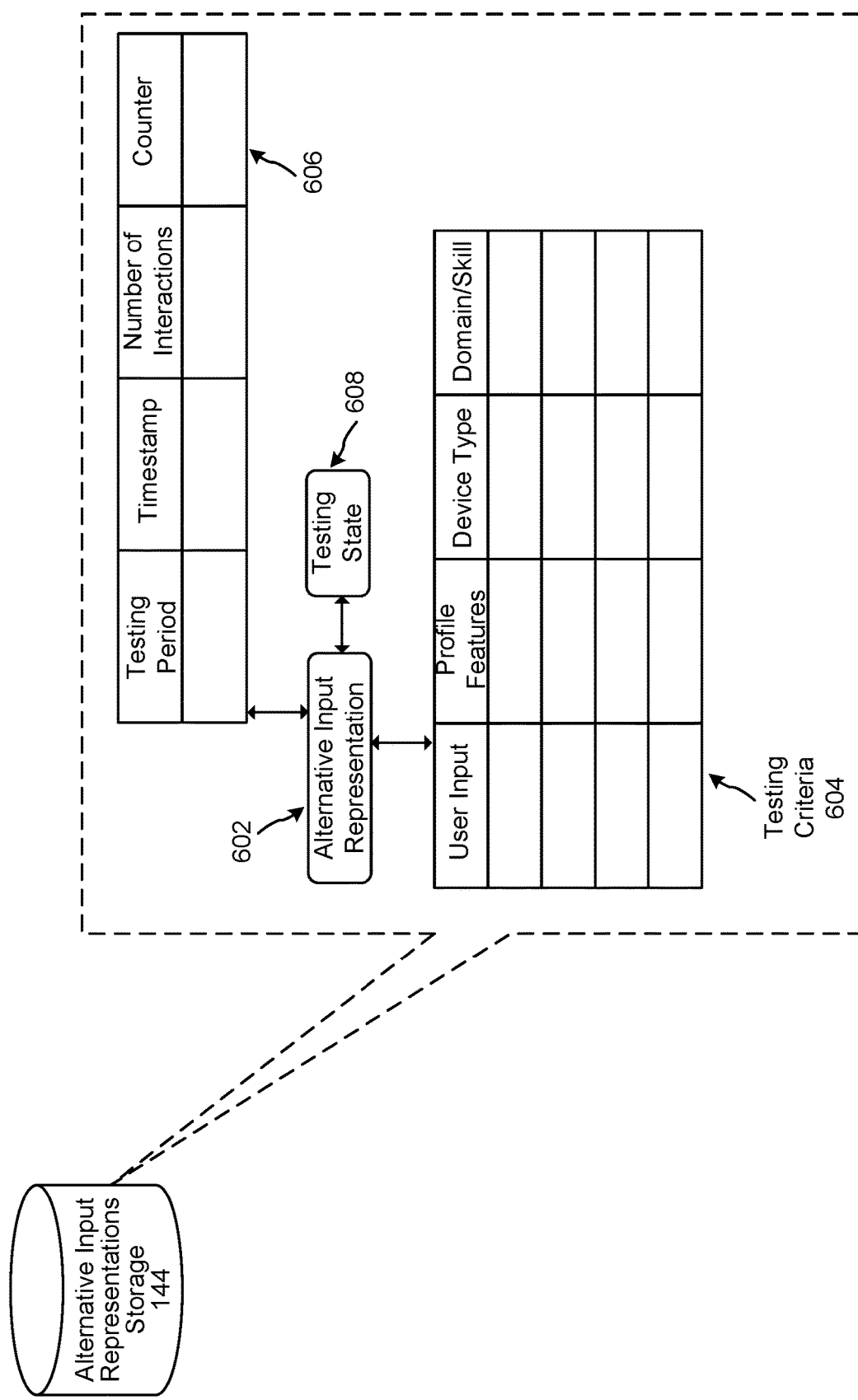
FIG. 5 illustrates example data that may be stored at an alternative input representations storage, according to embodiments of the present disclosure.
Figure 6:
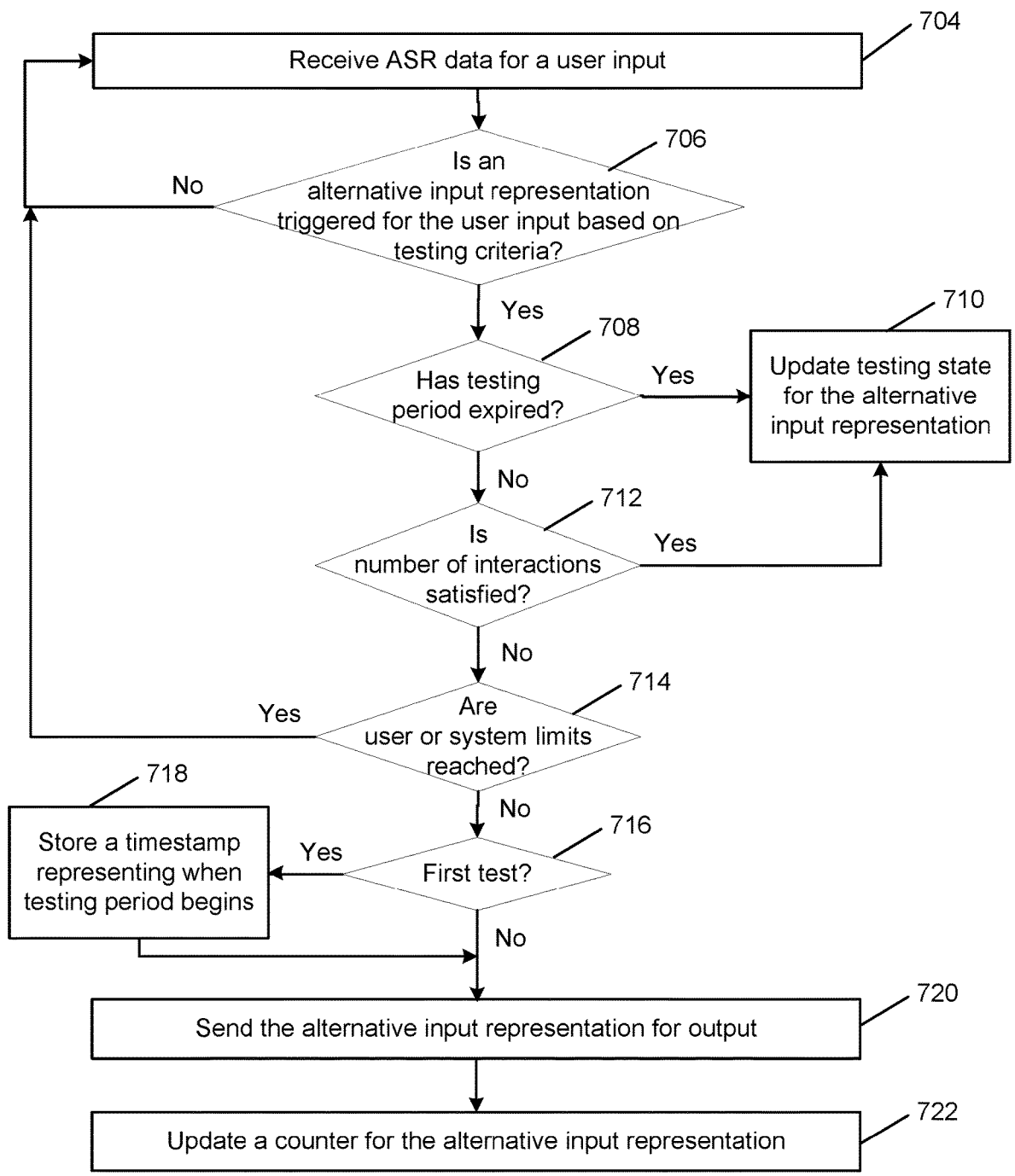
FIG. 6 is a flow chart illustrating an example process performed by the alternative input testing component, according to embodiments of the present disclosure.
Figure 7:
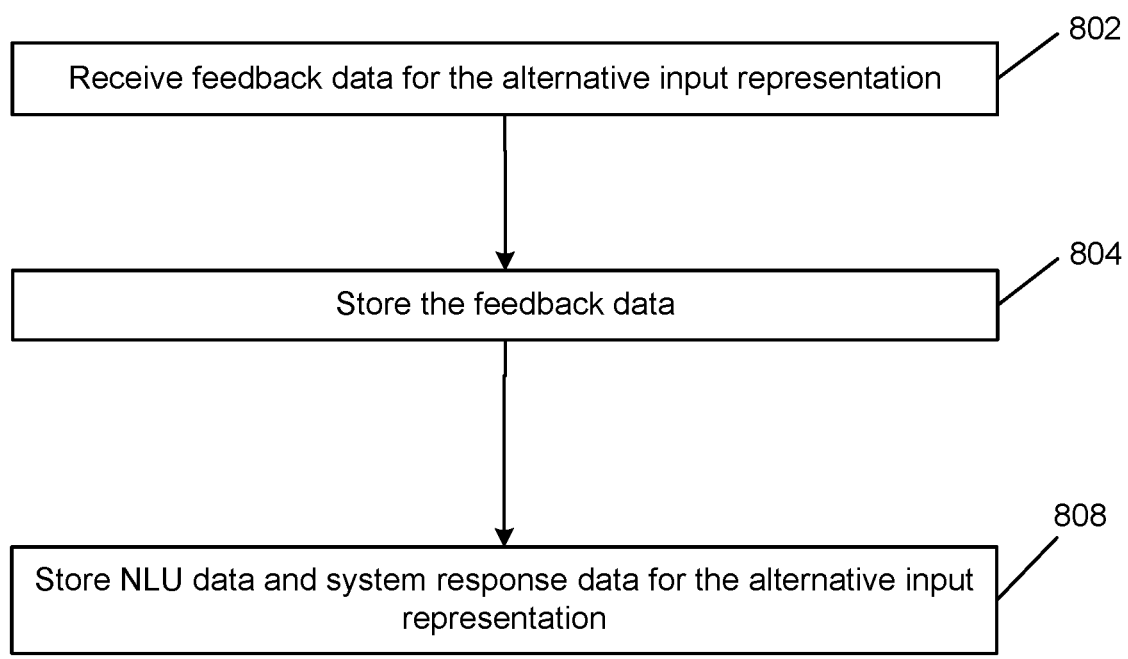
FIG. 7 is a flow chart illustrating an example process performed by the alternative input testing component, according to embodiments of the present disclosure.

FIGS. 6 and 7 are flow charts illustrating example processes that may be performed by the alternative input testing component 410. The functionalities of the alternative input testing component 410 are described below in reference to FIGS. 4, 5, 6 and 7.

The alternative input representations storage 144 may store multiple different alternative input representations. An alternative input representation may be provided by an application, which may receive it from a user, such as a developer, and may represent an alternative input representation that the application wants to test. In other embodiments, an alternative input representation, stored at the storage 144, may be received from (or based on processing by) one or more of the alternative input systems 420, 430 and 480. For example, the first alternative input system 420 may not have enough interaction data or user feedback data for a particular alternative input representation, and hence may be included in the alternative input representations storage 144 for testing and collecting data. The alternative input representations storage 144 may also store other data, such as that illustrated in FIG. 5 and described below.

At a step 704, the alternative input testing component 410 may receive the ASR data 402 for a user input, where the user input may be a spoken input provided by the user 105 and captured by the device 110. The audio data representing the spoken input may be processed by the ASR component 150 to generate the ASR data 402. The ASR data 402 may include one or more ASR hypothesis, each of which may include token data or text data and a corresponding confidence score. In other embodiments, the ASR data 402 may only be token data or text data corresponding to the words of the spoken input as recognized by the ASR component 150.

At a decision block 706, the testing criteria component 142 may determine whether an alternative input representation (in the alternative input representations storage 144) is triggered for the user input based on testing criteria. The testing criteria component 142 may retrieve an (first) alternative input representation from the alternative input representations storage 144. The testing criteria component 142 may also retrieve data corresponding to the first alternative input representation, such as, the data illustrated in FIG. 5.

FIG. 5 illustrates example data that may be stored at the alternative input representations storage 144 for an alternative input representation. As shown, the alternative input representations storage 144 may store testing criteria data 604 and data 606 associated with an alternative input representation 602. The alternative input representation 602 may be token data, text data or other type of data. The testing criteria data 604 may include information that the testing criteria component 142 may use to determine whether the alternative input representation 602 is triggered for the user input. For example, the testing criteria data 604 may include a user input(s) (e.g., token data or text data) for which the alternative input representation 602 is triggered. That is, when the system 120 receives a spoken input that corresponds to the user input stored in the testing criteria data 604, the testing criteria component 142 may determine that the alternative input representation 602 is triggered. As a further example, the testing criteria data 604 may store one or more profile features indicating that the alternative input representation 602 is triggered when the spoken input is received from a user having a user profile including the stored profile feature(s) (e.g., user demographics information, user location, account type, account permissions, etc.). As a further example, the testing criteria data 604 may store a device type(s) indicating that the alternative input representation 602 is triggered when the spoken input is received from a device that corresponds to the stored device type. As yet a further example, the testing criteria data 604 may store a domain or skill identifier(s) indicating that the alternative input representation 602 is triggered when the received spoken input is processable by a domain or skill component(s) corresponding to the stored domain or skill identifier(s).

The testing criteria component 142 may receive other data 502 corresponding to the spoken input from the orchestrator component 130. Such data 502 may at least include user profile data for the user 105 from the profile storage 270, information for the device 110, and domain or skill identifiers corresponding to the spoken input received from the NLU component 160. The testing criteria component 142 may process (compare) the ASR data 402 and the other data 502 with respect to the stored testing criteria data 604 for the alternative input representation 602. Based on this processing, the testing criteria component 142 may determine whether the (first) alternative input representation 602 is triggered. If the first alternative input representation is not triggered, then the testing criteria component 142 may retrieve the next (second) alternative input representation from the alternative input representations storage 144, and determine whether the second alternative input representation is triggered based on processing the testing criteria data associated with the second alternative input representation with respect to the ASR data 402 and the other data 502 corresponding to the spoken input.

At a decision block 708, the testing criteria component 142 may determine if a testing period for the triggered alternative input representation has expired. As shown in FIG. 5, the alternative input representations storage 144 may also store the data 606, which may include a testing period field indicating a duration of time, since testing begins, during which the alternative input representation 602 can be presented to a user for testing. For example, the testing period field of the data 606 may be 72 hours, indicating that the alternative input representation 602 can be tested for 72 hours once testing begins. The data 606 may also include a timestamp field indicating when testing for the alternative input representation 602 began. The testing criteria component 142 may determine whether the testing period has expired based on the values of the testing period field and the timestamp of the data 606.

If the testing period has expired, then at a step 710 the alternative input testing component 410 may update the testing state 608 (e.g., set it to "done" or "tested") for the alternative input representation in the alternative input representations storage 144, so that the testing criteria component 142 does not retrieve it, from the alternative input representations storage 144, for testing again. In some embodiments, the alternative input representation 602 may be associated with a testing state 608 in the alternative input representations storage 144, as shown in FIG. 5. If the testing period has expired, the alternative input testing component 410 may set the testing state 608 to "tested", "done" or another value representing that testing of the alternative input representation 602 has ended or has been completed.

If the testing period for the triggered alternative input representation has not expired (is unexpired), then at a decision block 712, the testing criteria component 142 may determine if a number of interactions for the triggered alternative input representation is satisfied. As shown in FIG. 5, the data 606 may also include a number of interaction field and a counter field for the alternative input representation 602. The number of interactions field of the data 606 may indicate how many times the alternative input representation 602 is to be presented for testing to a user for testing. The counter field of the data 606 may keep track of how many times the alternative input representation 602 has been presented for testing to one or more users of the system 120. Using the value in number of interactions field and the value in the counter field, the testing criteria component 142 may determine whether the number of interactions for the alternative input representation 602 has been satisfied.

If the number of interactions has been satisfied, then at the step 710 the alternative input testing component 140 may update the testing state 608 (e.g., set it to "done" or "tested") for the alternative input representation in the alternative input representations storage 144. In some embodiments, the alternative input component 410 may also set the testing state 608 to "done" or another value indicating the testing for the alternative input representation 602 has ended.

If the number of interactions for the alternative input representation has not been satisfied, then at a decision block 714, the interaction control component 520 may determine whether user or system limits have been reached for testing alternative input representations. The testing criteria component 142 may send a potential alternative input representation 512 to the interaction control component 520 for evaluation. The interaction control component 520 may store a predefined condition for a number of times alternative input representations can be presented for testing to the same user in a given period of time. For example, the interaction control component 520 may store data indicating that the same user may be presented five alternative input representations for testing within 72 hours. The interaction control component 520 may also store a predefined condition for a number of times the system 120 can present alternative input representations for testing. For example, the interaction control component 520 may store data indicating that the system 120 can test 500 alternative input representations within 24 hours. These predefined conditions may be set by a system administrator. Using these predefined conditions, the interaction control component 520 may determine if the user or system limits have been reached. In some embodiments, the interaction control 520 may also consider a provider-based condition that may specify a number of times alternative input representations from a particular provider (e.g., a user that provided the alternative input representation, such as, a skill developer, system administrator, etc.) can be tested within a given period of time.

If the user or system limits have been reached, then the alternative input testing component 410 may process ASR data for another (subsequently received) user input (starting at the step 704), and may determine whether an alternative input representation from the alternative input representations storage 144 is triggered for the subsequently received user input.

If the user and system limits have not been reached, then at a decision block 716, the alternative input testing component 410 may determine whether the instant interaction is a first test for the potential alternative input representation 512. For example, the alternative input testing component 410 may use the timestamp field of the data 606 (shown in FIG. 5) stored at the alternative input representations storage 144 and associated with the potential alternative input representation 512 to determine whether testing of the potential alternative input representation 512 has started. If the timestamp field of the data 606 is null (empty), then the alternative input testing component 410 may determine that this interaction is the first test. In this case, the alternative input testing component 410 may, at a step 718, store a timestamp (in the data 606) representing when (e.g., the current time) testing period begins.

If there is a timestamp in the timestamp field of the data 606, then the alternative input testing component 410 may determine that this interaction is not the first test. After storing the timestamp (at the step 718) or after determining that this is not the first test, the interaction control component 520, at a step 720, may send the potential alternative input representation 512 for output. The interaction control component 520 may send the potential alternative input representation 512 to the output generation component 530.

The output generation component 530 may determine how the potential alternative input representation 512 is to be presented to the user 105. The output generation component 530 may determine an output type for the potential alternative input representation 512. For example, the output generation component 530 may determine that the potential alternative input representation 512 is to be presented as synthesized speech. In some cases, the output generation component 530 may determine that the potential alternative input representation 512 is to be presented as a confirmation request where the system 120 asks the user 105 to confirm performance of an action based on the potential alternative input representation 512 before performing the action. For example, the system 120 may cause the device 110 to output audio representing synthesized speech "do you want me to add ranch dressing to the shopping list?" In other cases, the output generation component 530 may determine that the system 120 is to perform an action corresponding to the potential alternative input representation 512 and then present an output to the user 105 indicating that the action was performed. For example, the system 120 may add an item "ranch dressing" to an electronic shopping list, and may cause the device 110 to output audio data representing "I added ranch dressing to the shopping list." The system 120 may additionally or alternatively cause the device 110 to display the electronic shopping list including the item "ranch dressing." The output generation component 530 may output alternative input representation data 540, which may include token data or text data corresponding to the potential alternative input representation 512, and may also include data on how the potential alternative input representation 512 is to be presented to the user 105 (e.g., an output type, a confirmation request, an affirmative action, etc.). The alternative input representation data 540 may be sent to the alternative input ranker 450 for evaluation. In some embodiments, the output generation component 530 may determine the output type for the potential alternative input representation 512 based on a confidence level of one or more of: the ASR component 150 in generating the ASR data 402, the NLU component 160 in generating NLU data for the spoken input, and the alternative input testing component 410 in identifying the potential alternative input representation 512. For example, if the confidence level is high, then the output generation component 530 may determine to perform an action corresponding to the potential alternative input representation 512, instead of asking for confirmation from the user 105.

At a step 722, the alternative input testing component 410 may update a counter for the potential alternative input representation. For example, the alternative input testing component 410 may increment a value stored in the counter field of the data 606 (shown in FIG. 5) Stored at the alternative input representations storage 144 and associated with the potential alternative input representation 512. If this is the first time the potential alternative input representation 512 is being presented for testing to a user, then the counter field of the data 606 may be null, in which case, the alternative input testing component 410 may store the value "1." The counter field of the data 606 may be used to track the number of times the potential alternative input representation 512 is tested.

When an alternative input representation has been tested—the number of interactions has been satisfied or the testing period has expired—then the alternative input representation is deleted from the alternative input representations storage 144. In some embodiments, the alternative input representations may be deleted from the storage 144 after a period of time has elapsed. In some embodiments, new alternative input representations may be added to the storage 144 for testing, and the system may block the addition if the new alternative input representation has already been tested in the past or is in the process of being tested (based on the storage 144 already having the same alternative input representation).

Output data corresponding to the alternative input representation 540 may be presented to the user 105 via the device 110. The system 120 may send audio data, to the device 110 for output, representing synthesized speech that may ask the user 105 to confirm an action corresponding to the alternative input representation 540. For example, the device 110 may output "did you mean add ranch dressing to the shopping list?" or "do you want me to add ranch dressing to the shopping list?" In some embodiments, the output data may indicate to the user 105 that an action corresponding to the alternative input representation 540 was performed. For example, the device 110 may output "ranch dressing is added to the shopping list."

Referring to FIG. 7, at a step 802, the signal collection component 550 may receive feedback data 542 for the alternative input representation 540. The user 105 may provide feedback in response to the output data corresponding to the alternative input representation 540. The user 105 may provide a spoken input, a physical input (e.g., selecting a button on the device 110, selecting a graphical user interface element on a display of the device 110, etc.), a gesture (e.g., a head nod, a thumbs up, etc.) or other type of input. Data representing the input may be processed by one or more components of the system 120. For example, in the case where the input is a spoken input, the ASR component 150 may process audio data representing the input, and determine ASR data corresponding to the words spoken by the user 105. The ASR data may be the feedback data 542 received by the signal collection component 550. At a step 804, the signal collection component 550 may store the feedback data 542 in the features storage 146. The feedback data 542 may be associated with the alternative input representation 540 in the features storage 146.

The input may indicate positive feedback, negative feedback or neutral feedback. For example, the user 105 may say "yes" to confirm performance of an action corresponding to the alternative input representation 540, which the signal collection component 550 may determine as being positive feedback. As another example, the user 105 may say "no" to reject performance of an action corresponding to the alternative input representation 540, which the signal collection component 550 may determine as being negative feedback. As a further example, the user 105 may say "thank you" in response to the system 120 performing an action corresponding to the alternative input representation 540, which the signal collection component 550 may determine as being positive feedback. As another example, the user 105 may say "that's wrong" or "that's not what I said," in response to the system 120 performing an action corresponding to the alternative input representation 540, which the signal collection component 550 may determine as being negative feedback.

At a step 808, the signal collection component 550 may store NLU data 552 and system response data 554 for the alternative input representation 540 in the features storage 146. The NLU data 552 may be a NLU hypothesis including intent data and entity data corresponding to the alternative input representation 540 based on the NLU component 160 processing the alternative input representation 540. The system response data 554 may be output data corresponding to the alternative input representation 540. The system response data 554 may also include a skill identifier corresponding to the skill 190 that is invoked to generate an output responsive to the alternative input representation 540. The system response data 554 may also include an output type (e.g., synthesized speech, display of text, display of image data, icons, operation of a smart home device, etc.) representing the manner in which the output data was presented to the user 105. The NLU data 552 and the system response data 554 may be associated with the alternative input representation 540 in the features storage 146. The features storage 146 may also store other data corresponding to the alternative input representation 540.

Figure 8:
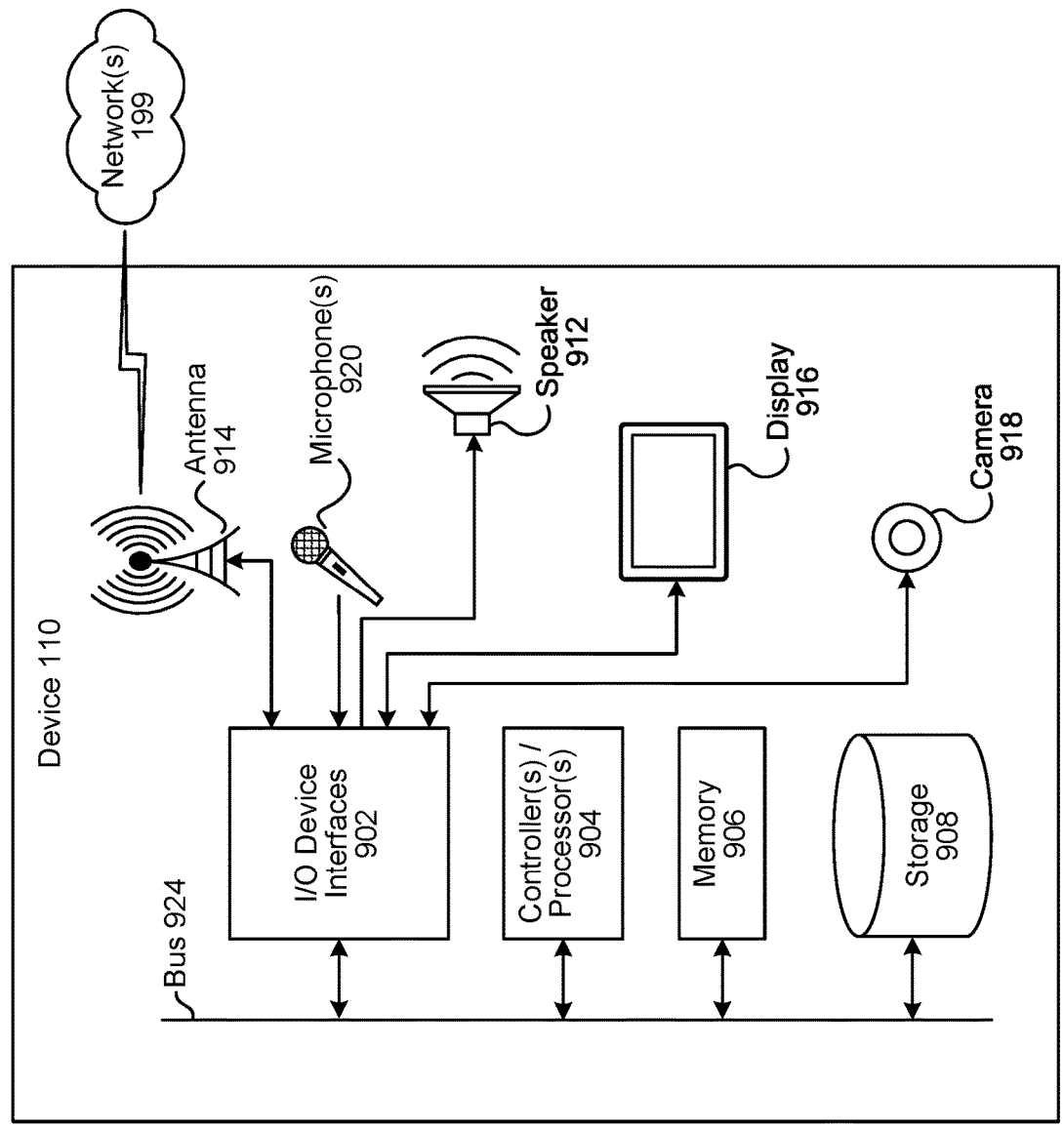
FIG. 8 is a block diagram conceptually illustrating example components of a device, according to embodiments of the present disclosure.

FIG. 8 is a block diagram conceptually illustrating a device 110 of the system 100. FIG. 9 is a block diagram conceptually illustrating example components of a remote device, such as the system 120 and the skill(s) system 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/225) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the system 100 of the present disclosure, such as, one or more systems 120 and/or one or more skills 225. In operation, each of these systems may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 8, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120, and/or skill 225 may include their own dedicated processors, memory, and/or storage. Alternatively, one or more of the components of the device 110, the system 120, and/or skill 225 may utilize the I/O interfaces (902/1002), processor(s) (904/1004), memory (906/1006), and/or storage (908/1008) of the device 110, the system 120, and/or skill 225, respectively.

As noted above, multiple devices may be employed in a single system. In such a multi-device system, each of the devices may include different components for performing different aspects of the system's processing. The multiple devices may include overlapping components. The components of the device 110, the system 120, and the skill 225, as described herein, are illustrative, and may be located as a stand-alone device or may be included, in whole or in part, as a component of a larger device or system.

As illustrated in FIG. 10, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 225, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a device, first audio data representing a first spoken natural language input;
determining that the first spoken natural language input corresponds to a first alternative input representation for which processing data is to be collected;
determining a first number of times the first alternative input representation is to be tested;
determining a counter value for the first alternative input representation, the counter value representing a second number of times the first alternative input representation has been presented for collecting processing data;
determining the first number of times is different than the second number of times;
in response to the first number of times being different than the second number of times, generating first output data requesting confirmation to perform an action using the first alternative input representation;
sending the first output data to the device;
receiving, from the device, second audio data representing user feedback corresponding to the first output data; and
storing the first alternative input representation and the user feedback for updating an alternative input component configured to determine alternative input representations for spoken natural language inputs.

2. The computer-implemented method of claim 1, further comprising:
determining natural language understanding (NLU) data corresponding to the first spoken natural language input;
determining a domain of the first alternative input representation;
determining that the NLU data satisfies the domain; and
wherein generating the first output data is further in response to determining that the NLU data satisfies the domain.

3. The computer-implemented method of claim 1, further comprising:
based on sending the first output data to the device, generating an updated counter value for the first alternative input representation;
determining that the updated counter value is equal to the first number of times; and
based on determining that the updated counter value is equal to the first number of times, setting a testing state, associated with the first alternative input representation, to indicate testing of the first alternative input representation has ended.

4. The computer-implemented method of claim 1, further comprising:
receiving a plurality of alternative input representations for which processing data is to be collected;
determining a second alternative input representation, from the plurality of alternative input representations, corresponds to the first spoken natural language input;
determining that a testing period for the second alternative input representation has expired; and
based on determining that the testing period has expired, setting a testing state, associated with the second alternative input representation, to indicate testing of the second alternative input representation has ended.

5. A computer-implemented method comprising:
receiving first audio data representing a spoken natural language input;
determining, based at least in part on the spoken natural language input, a first alternative input representation is to be presented to a user for collecting processing data corresponding to the first alternative input representation;
determining a counter value representing a number of times the first alternative input representation has been presented for collecting processing data;
determining the counter value is less than a threshold value;
generating first output data using the first alternative input representation;
causing presentation of the first output data;
receiving user feedback corresponding to the first output data; and
storing the first alternative input representation and the user feedback for updating an alternative input component.

6. The computer-implemented method of claim 5, further comprising:
determining that a time period for the first alternative input representation is unexpired; and
generating the first output data based on the time period being unexpired.

7. The computer-implemented method of claim 5, further comprising:
based on causing presentation of the first output data, generating an updated counter value representing the number of times the first alternative input representation has been presented for collecting processing data.

8. The computer-implemented method of claim 5, further comprising:
determining natural language understanding (NLU) data corresponding to the first alternative input representation;
determining, using the NLU data, second output data responsive to the first alternative input representation; and
storing the NLU data and the second output data for later use in updating the alternative input component.

9. The computer-implemented method of claim 5, further comprising:
identifying criteria associated with the first alternative input representation, the criteria including at least one user profile feature;
determining profile data corresponding to the first audio data;
determining that the at least one user profile feature is represented in the profile data; and
determining the first alternative input representation is to be presented based at least in part on the at least one user profile feature being represented in the profile data.

10. The computer-implemented method of claim 5, further comprising:
identifying criteria associated with the first alternative input representation, the criteria including at least a device type;
determining a device associated with the first audio data corresponds to the device type; and determining the first alternative input representation is to be presented based at least in part on the device corresponding to the device type.

11. The computer-implemented method of claim 5, further comprising:
receiving a plurality of alternative input representations for presenting;
determining a second alternative input representation, from the plurality of alternative input representations, corresponding to the spoken natural language input;
determining that a time period for presenting the second alternative input representation has expired; and
setting data, associated with the second alternative input representation, to indicate that presentation of the second alternative input representation for collecting processing data corresponding to the second alternative input representation has been completed.

12. The computer-implemented method of claim 5, further comprising:
after causing presentation of the first output data, determining that the counter value meets or exceeds the threshold value; and
setting data, associated with the first alternative input representation, to indicate that presentation of the first alternative input representation for collecting processing data corresponding to the first alternative input representation has been completed.

13. A system comprising:
at least one processor; and
at least one memory including instructions that, when executed by the at least one processor, cause the system to:
receive first audio data representing a spoken natural language input;
determine, based at least in part on the spoken natural language input, a first alternative input representation is to be presented to a user for collecting processing data corresponding to the first alternative input representation;
determine a counter value representing a number of times the first alternative input representation has been presented for collecting processing data;
determine the counter value is less than a threshold value;
generate first output data using the first alternative input representation;
cause presentation of the first output data;
receive user feedback corresponding to the first output data; and
store the first alternative input representation and the user feedback for updating an alternative input component.

14. The system of claim 13, wherein the at least one memory includes further instructions that, when executed by the at least one processor, further cause the system to:
determine that a time period for the first alternative input representation is unexpired; and
generate the first output data based on the time period being unexpired.

15. The system of claim 13, wherein the at least one memory includes further instructions that, when executed by the at least one processor, further cause the system to:
based on causing presentation of the first output data, generating an updated counter value representing the number of times the first alternative input representation has been presented for collecting processing data.

16. The system of claim 13, wherein the at least one memory includes further instructions that, when executed by the at least one processor, further cause the system to:
determine natural language understanding (NLU) data corresponding to the first alternative input representation;
determine, using the NLU data, second output data responsive to the first alternative input representation; and
store the NLU data and the second output data for later use in updating the alternative input component.

17. The system of claim 13, wherein the at least one memory includes further instructions that, when executed by the at least one processor, further cause the system to:
identify criteria associated with the first alternative input representation, the criteria including at least one user profile feature;
determine profile data corresponding to the first audio data;
determine that the at least one user profile feature is represented in the profile data; and
determine the first alternative input representation is to be presented based at least in part on the at least one user profile feature being represented in the profile data.

18. The system of claim 13, wherein the at least one memory includes further instructions that, when executed by the at least one processor, further cause the system to:
identify criteria associated with the first alternative input representation, the criteria including at least a device type;
determine a device associated with the first audio data corresponds to the device type; and
determine the first alternative input representation is to be presented based at least in part on the device corresponding to the device type.

19. The system of claim 13, wherein the at least one memory includes further instructions that, when executed by the at least one processor, further cause the system to:
receive a plurality of alternative input representations for presenting;
determine a second alternative input representation, from the plurality of alternative input representations, corresponding to the spoken natural language input;
determine that a time period for presenting the second alternative input representation has expired; and
set data, associated with the second alternative input representation, to indicate that presentation of the second alternative input representation for collecting processing data corresponding to the second alternative input representation has been completed.

20. The system of claim 13, wherein the at least one memory includes further instructions that, when executed by the at least one processor, further cause the system to:
after causing presentation of the first output data, determine that the counter value meets or exceeds the threshold value; and
set data, associated with the first alternative input representation, to indicate that presentation of the first alternative input representation for collecting processing data corresponding to the first alternative input representation has been completed.

* * * * *